(12) United States Patent
Lloyd

(10) Patent No.: US 6,932,413 B2
(45) Date of Patent: Aug. 23, 2005

(54) MODULAR GRILL

(75) Inventor: Thomas M. Lloyd, Beach Haven, NJ (US)

(73) Assignee: GMA Manufacturing, Inc., Huntingdon Valley, PA (US)

( * ) Notice: Subject to any disclaimer, the term of this patent is extended or adjusted under 35 U.S.C. 154(b) by 29 days.

(21) Appl. No.: 10/696,874

(22) Filed: Oct. 30, 2003

(65) Prior Publication Data

US 2005/0093309 A1    May 5, 2005

(51) Int. Cl.[7] .............................................. B60J 7/00
(52) U.S. Cl. ...................................................... 296/115
(58) Field of Search ........................ 293/115; 180/68.6

(56) References Cited

U.S. PATENT DOCUMENTS

| | | | |
|---|---|---|---|
| 1,683,283 A * | 9/1928 | Bowman ..................... 293/115 |
| 1,971,155 A | 8/1934 | Green ........................... 293/54 |
| 2,071,673 A * | 2/1937 | Whitlock .................... 180/68.6 |
| 2,150,130 A | 3/1939 | Ragsdale ..................... 189/86 |
| 2,169,695 A | 8/1939 | Hollins ........................ 293/55 |
| 2,345,650 A | 4/1944 | Attwood ..................... 189/36 |
| D153,593 S * | 5/1949 | Faulhaber ................... 293/115 |
| 2,489,020 A * | 11/1949 | Faulhaber ................... 293/115 |
| 2,699,964 A * | 1/1955 | Hartung ...................... 293/115 |
| 2,873,095 A | 2/1959 | Blum .......................... 256/65 |
| 2,911,242 A | 11/1959 | Bickerstaff, Jr. ............. 287/54 |
| 2,932,488 A | 4/1960 | Dotson ........................ 256/21 |
| 3,195,937 A | 7/1965 | Case ............................ 287/54 |
| 3,258,250 A | 6/1966 | McMullin ................... 256/13.1 |
| 3,333,823 A | 8/1967 | Genauer et al. .............. 256/65 |
| 3,343,811 A | 9/1967 | Kusel et al. .................. 256/22 |
| 3,368,798 A | 2/1968 | Kusel et al. .................. 256/65 |
| 3,529,808 A | 9/1970 | Siebers ........................ 256/65 |
| 4,623,128 A | 11/1986 | Dutch .......................... 256/65 |
| 6,012,761 A * | 1/2000 | Hellhake et al. ............ 293/115 |
| 6,315,338 B1 * | 11/2001 | Schneider et al. .......... 293/115 |
| 6,702,343 B1 * | 3/2004 | Stull ............................ 293/115 |
| 6,761,385 B2 * | 7/2004 | Taljaard ...................... 293/115 |

* cited by examiner

Primary Examiner—Lori L. Coletta
(74) Attorney, Agent, or Firm—Paul & Paul

(57) ABSTRACT

Grillwork for automotive uses, fencing, and railings includes a series of parallel extending rail members each attachable to cross support members at two locations thereon, to support each rail member and to hold each rail member in position on the cross support members. Two mounting pieces, attachable to respective cross support members, are used to hold/mount each rail member. The mounting pieces each slide into locked position at an end of each rail and also provide an end cap/finish piece for the rail. The rails and the mounting pieces are manufactured of similar materials and by similar manufacturing techniques. The materials of manufacture can extend from various metals, to various thermoplastics, to reinforced plastic composites such as fiberglass reinforced materials.

19 Claims, 6 Drawing Sheets

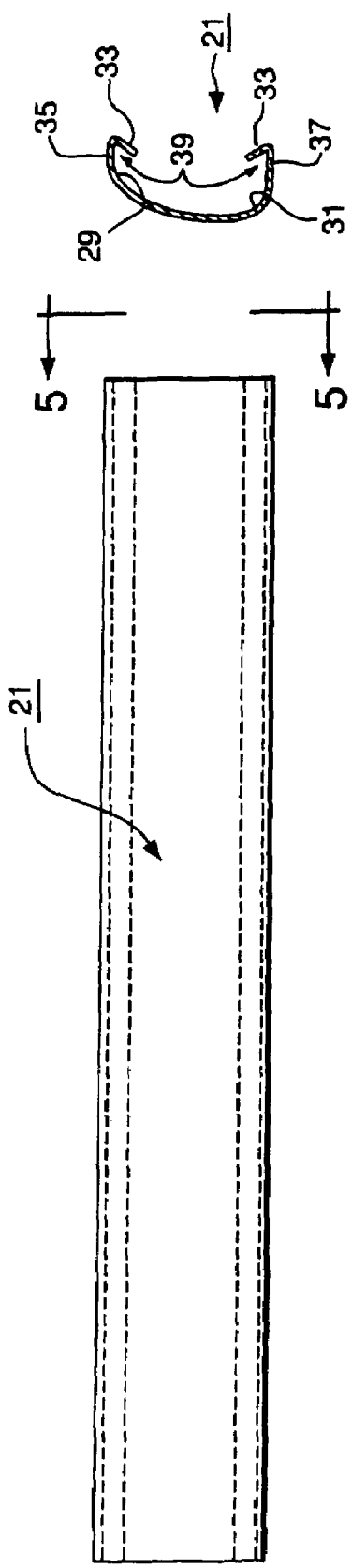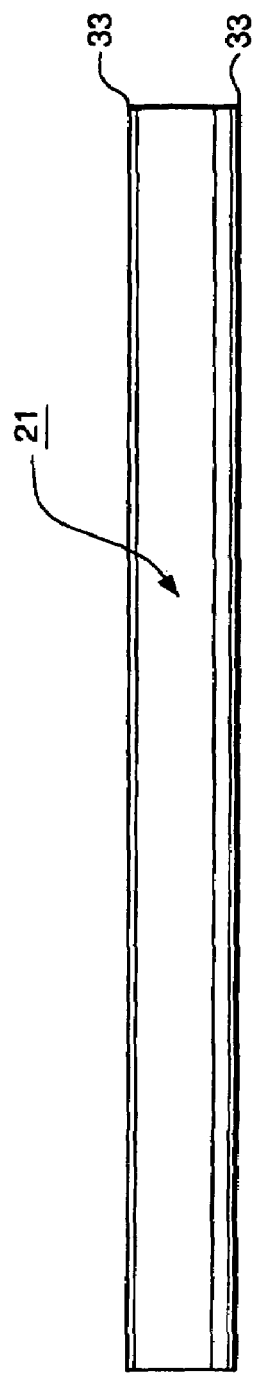
FIG. 3
FIG. 4
FIG. 5

MODULAR GRILL

RELATED APPLICATIONS

Not applicable.

FEDERALLY SPONSORED RESEARCH

Not applicable.

MICROFICHE APPENDIX

Not applicable.

BACKGROUND OF THE INVENTION

The present invention is directed to grills, including modular grills which structures are applicable for truck grills, fencing and other such structures that can be assembled in a modular fashion.

Green, U.S. Pat. No. 1,971,155, shows a radiator grill assembly that is assembled from vertical standing curved bars attached to a cross-support member with bolts and nuts or spot welds. Ragsdale, et al., U.S. Pat. No. 2,150,130, show a removable paneling held to upright elements with bolts and nuts, with each bolt also holding a spring clip. Horizontal concave cover strips are attached to a series of in-line horizontal positioned spring clips. Hollins, U.S. Pat. No. 2,169,695, shows a grill guard comprising a plurality of vertical standing tubes which are each held to a cross support by an individual bolt and nut.

Various methods and attachments have been employed to join structural members of fences, railings and other such structures. Attwood, U.S. Pat. No. 2,345,650, and Bickerstaff, Jr., U.S. Pat. No. 2,991,242, each show various angle plates, clamps and the like for joining channels to one another, I-beams to bars, and tubes to channel members. Blum, U.S. Pat. No. 2,873,095, shows a slotted keyway and keys or posts for joining caps to rail members.

Dotson, U.S. Pat. No. 2,932,488, shows building structure having curved covers or caps which slide onto the flanges of structural members utilizing recurved retaining flanges.

Case, U.S. Pat. No. 3,195,937, Genauer et al. U.S. Pat. No. 3,333,823, Kusel et al., U.S. Pat. Nos. 3,343,811 and 3,368,798, and Siebers, U.S. Pat. No. 3,529,808, each show methods and structures for assembling railings utilizing slidable attachment and/or joining members. Lastly, McMullin, U.S. Pat. No. 3,258,250 shows a railing construction with vertical standing I-beams and horizontal C-channels held thereto by sliding onto flanges. Dutch, et al. likewise shows flange assembly for fencing sections.

Of paramount importance in the manufacture and assembly of these grilles, fences and railings, after the factors esthetics and strength are considered, is the cost of manufacture and assembly of the manufactured parts. The prior art either employs cast or machined joining members that are shaped for strength, or requires a large number of simpler joining members. Either way the cost has been increased by the cost of casting and machining, or stamping and machining, or the necessity of a larger number of simpler parts to provide the required rigidity and strength.

What is desired of the present invention is a system of manufacturing and assembling a series of rails on horizontal or vertical cross support members, for making an automotive grill suitable for large vehicles, or for making sections of railings and fences.

What is secondly desired of the present invention is a rigid joining member for joining individual rails or blades or bars to the cross support members.

What is also desired is such a rigid joining member that is more economically manufactured while maintaining the desired strength and rigidity.

What is further desired is such a rigid joining member that incorporates and end cap for each rail, blade or bar.

What is also further desired is such a rigid joining member that slidably installs on the rails of the grill and which structure eliminates the need for any machining.

SUMMARY OF THE INVENTION

The objectives of the present invention are realized in a grillwork system and a method of manufacturing the components for the grillwork system. The methods of manufacture will be affected by the materials of manufacture and can vary from injection molded or extruded thermoplastics, molded reinforced plastic composites, to hot rolled or cold rolled metals. With metals die stamping may complete a manufacturing operation.

A grill, or fence section or railing section may be preferably made of cold rolled metal, such as stainless steel. In such instance when an ausenitic stainless steel, such as 301 is used, cold working, such as cold rolling, hardens the material, which is a desirable affect.

A grill assembly has a pair of end-positioned vertical risers (or cross support members), such a Z-bars, to which brackets (mounting pieces) are secured by screws, rivets, weld points, and the like. Each bracket has at least two attachment points to preclude racking (rotating out of square), when a grill is partially assembled, or when it is shipped without the end risers (cross support members) being secured.

A grill is assembled from a plurality of cross bars (rails, rail members, and formed channel members) fitted to the end risers. The cross-sectional shape of these bars, their number, their spacing, and their length is determined by the application in which they are used. Each bracket includes an end cap which fits into an end of a bar giving the bar reveal (side opening) the appearance of having a finished tooled end.

Bar lengths are cold formed in a roll-former or press break from flat or coiled cold rolled steel or stainless steel material. A die shape is set to provide a cross-section shape, such as a C-channel or other similar shape, with a return flange or lip to retain an end cap. A strengthening sweep or curve is generated in the forming operation. The shape of the formed bar can be parted-off to a desired grille width (or length) or fence height, or produced in long stock lengths with final sizing at a job site.

The crossbar, i.e. each bar length is secured by use of die formed end-caps with one end sized to fit into the inside of the crossbar (bar length) section and the other end flared to generate a cosmetic finish. The end-caps are made from the same material as the crossbar with an internal die form, formed inside-out, with an attachment section featuring a series of holes or attachment points.

The attachment mullion, to which a crossbar is attached by the end-cap/attachment bracket, can be in the shape of a hat, "Z" bar, or angle iron that will facilitate the end-cap's attachment points. The mullion or column has attachment holes which can be pierced or drilled to mount the desired number of crossbars.

Alternatively, roll stock is trimmed to the finished width for brackets, then sliced to length for each bracket, and then run through a cold roll former to obtain the cross-sectional C-shape or other shape.

Bar lengths are further cold rolled to form return lips (recurved retaining flanges) on each side leg of the channel shaped bar, which act as finishing shapes and retaining shapes for the brackets. When the alternative method for forming the brackets is employed, the recurved retaining flanges are formed in a two-stage forming process, where the first stages is the cross-sectional shape forming and the second stage immediately thereafter is the recurved retaining flanges forming.

When a grill section is assembled onsite, such as assembling security bars for window and door protection, the rolled formed bar lengths can be cut to size with a RADIAC® wheel or other suitable tool.

Bar lengths are bowed outwardly, slightly, to give a rounded shaped appearance and to add strength to the length between the attachment brackets positioned at each end.

Each bracket includes an end cap, which can be cup-shaped, this end cap being positioned at one end. Each bracket also includes an under-sized middle section that includes a back face attachment wall carrying at least two attachment points and an under-sized outboard end section. An abutment step down (shoulder) is created at the point where the end cap joins the middle section. Each bracket slides onto the end of a bar length with the bracket's side legs fitting into the recurved retaining flanges of a bar length. The insertion ends when the bracket shoulder, at the juncture of the end cap under sized section, abuts the end of the bar length. The under-sized sections adjacent the end cap and at the far end of the bracket form conforming walls which sit against the inside wall of the bar length, thereby forming a "neat" and secure fit between the two members.

While the sequence of process steps for the manufacturing method can be interchanged, substituted, and/or re-shuffled, the advantage of this manufacturing method is that the stock for forming the bar lengths is the same as the stock for forming the brackets. The brackets are formed in a similar, cold roll process to the bar lengths and the bracket shape is such that installation on a bar length is a simple operation, with a bracket's shape lending to its rigidity and strength.

BRIEF DESCRIPTION OF THE DRAWINGS

The features, advantage and operation of the present invention will become readily apparent and further understood from a reading of the following detailed description with the accompanying drawings, in which like numerals refer to like elements, and in which:

FIG. 3 is a top or plan view of a length of bar with its sides and recurved retaining flanges in phantom;

FIG. 4 is a bottom or inside view of the length of bar length of FIG. 3;

FIG. 5 is an end view showing the cross-sectional view of the bar length of FIGS. 3 and 4;

DETAILED DESCRIPTION OF THE INVENTION

The present invention is grillwork, which may be modularly assembled into a desired structure, such as a vehicle grille, fence sections, and railing sections, and the process steps for manufacturing the components for the grillwork and the process steps for assembling a modular section.

Figure 1:
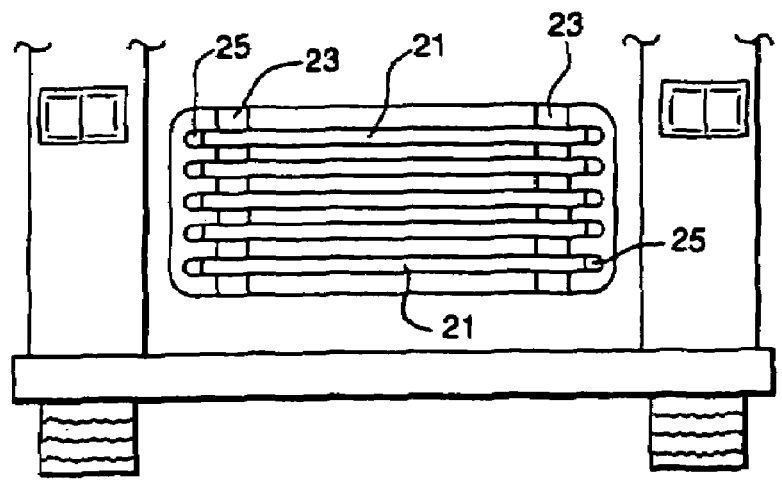
FIG. 1 is front elevation of an assembled grille on a motor vehicle with two vertical support members and horizontal grille bar lengths.

A series of bar lengths (rails) 21, FIG. 1, is mounted to a pair of upright supports (vertical risers) 23. Each bar length 21 is mounted to the two upright supports 23 with a pair of brackets (mounting pieces) at each end of a bar 21, each bracket 25 having an integral end cap member for dressing the reveal of the bar length 21.

The shape of the end cap portion of a bracket 25 is chosen for the esthetics of the application. The outer edge may be circular, oval, a partial hyperbola, a partial parabola or any other curved shape. The shape may be symmetrical (round or oval) for an assembly for fencing, FIG. 2, and parabolic for an assembly for an automotive grille, FIG. 1.

Figure 2:
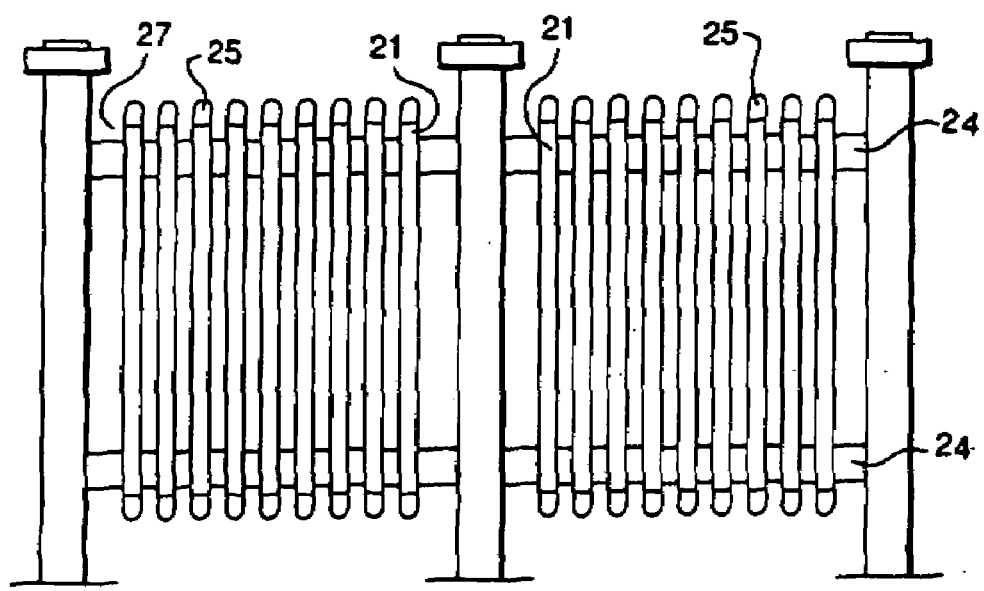
FIG. 2 is a front elevation of assembled sections of a fence with two horizontal support members and vertical bar lengths.
Figure 7:
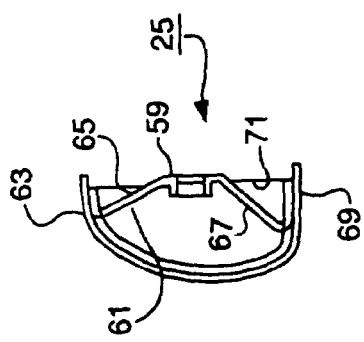
FIG. 7 is an end view of the bracket of FIG. 6 taken from insertion end.

In the fencing, FIG. 2, the cross supports 24, run horizontally, and the rail members 21 run vertically. The length of the rail members 21 is determined by the application. The length of each bracket member 25 affects the attachment position of the brackets 25, and the distance 27 beyond the cross supports 24 the rail member 21 and its bracket/end piece 25 will extend.

For the automotive grill of FIG. 1, cold rolled bar lengths 21, FIGS. 3, 4, and 5, can be made of 1040 carbon steel and then chrome finished. For a given structure, each bar length (rail) 21 is manufactured to an identical length, width, and cross-sectional shape. In an assembly various widths can be selected or uniform widths can be used. Individual lengths can cut in-situ, as desired. For the automotive grill of FIG. 1, each of the grill blades, which are the rails/bar lengths 21 are of equal length and width.

The automotive grill application of FIG. 1 has each bar length (rail) 21, FIG. 4, slightly bowed to give a rounded shape appearance. The cross-section, FIG. 5, of each rail 21 is C-shaped, to form a hollow channel having an open face, with the radius of curvature of the upper curve 29 being greater than the radius of curvature of the lower curve 31. Thus the C-shape of the channel approaches a parabolic shape.

The outer edges 33 of the top 35 and bottom 37 legs of the channel shaped bar length 21 are recurved inwardly to form retaining flanges (return lips) 39.

Brackets 25, for the automotive grill, FIG. 1, have an end cup 41, FIGS. 6, 7, 8, and 9, a body portion having an under sized middle portion 43, a back face attachment wall 45, and an under sized end portion 47. A step down (transition) 49 creates as shoulder and abutment point at the jointure of the end cup 41 to the middle under sized portion 43. The back face attachment wall 45 is formed between the middle and end under sized portions, 43, 47.

Figure 6:
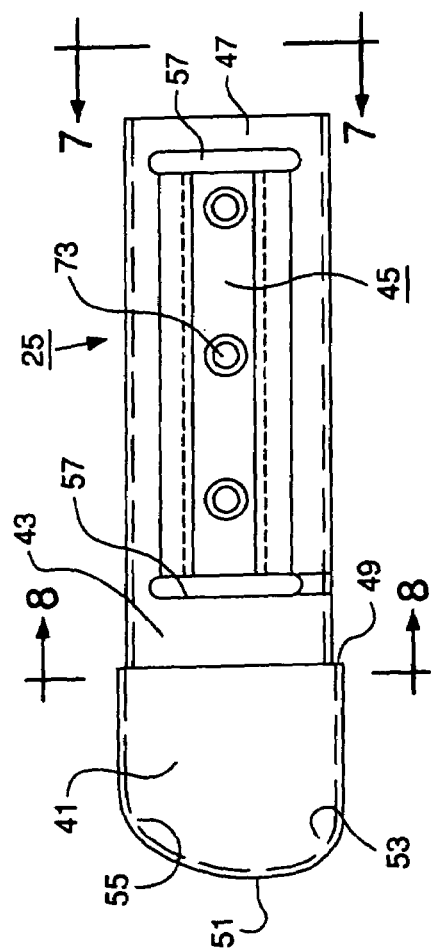
FIG. 6 is a top or plan view of a support bracket with integral end cap.
Figure 9:
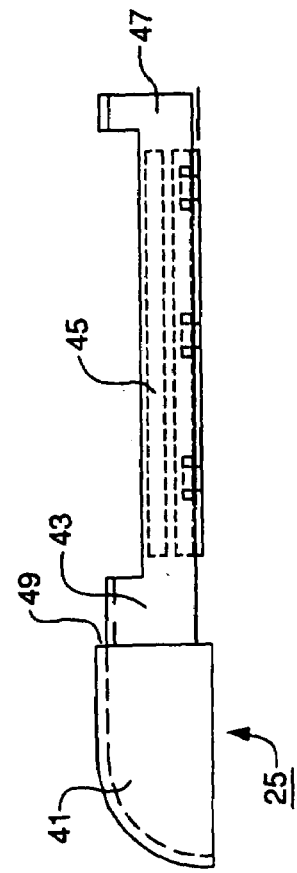
FIG. 9 is a side view of the bracket of FIG. 6 with the back wall and three attachment holes shown in phantom.
Figure 8:
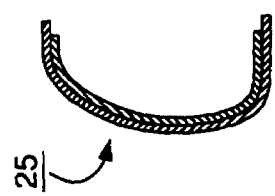
FIG. 8 is a cross-sectional view of the end cap and integral bracket insert portion.
Figure 10D:
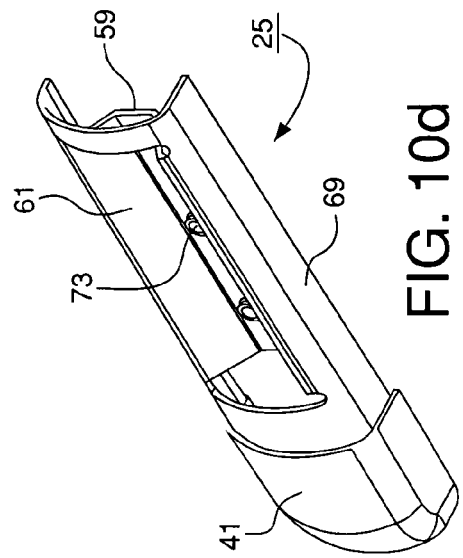
FIGS. 10c and 10d are second left angle and second right end views, respectively.
Figure 10B:
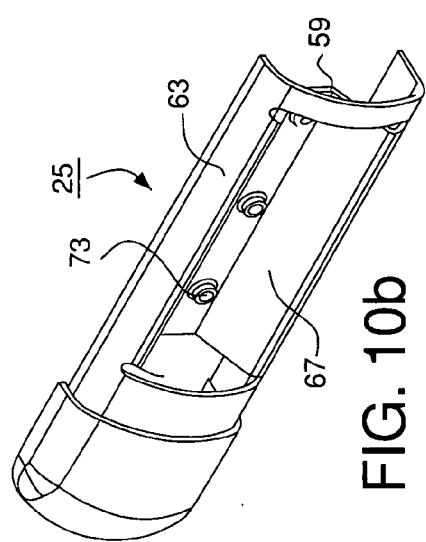
FIGS. 10a and 10b are first left angle and first right angle end views, respectively, of the bracket of FIG. 6.
Figure 10A:
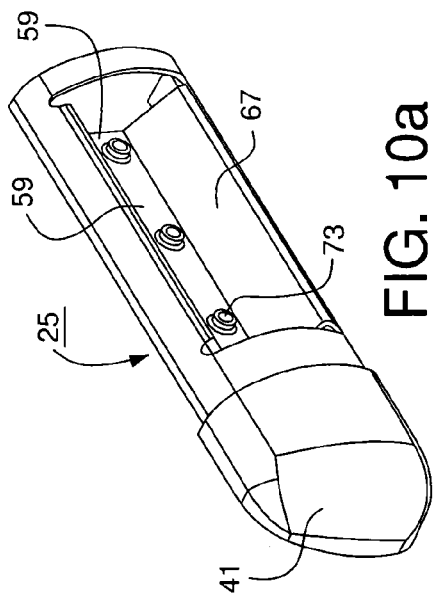
Figure 10C:
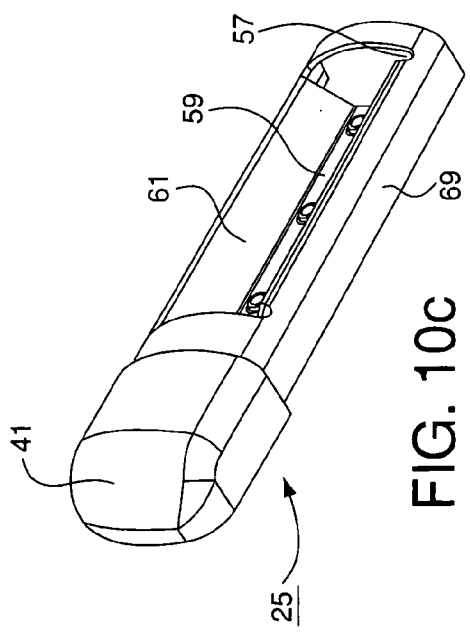

The parabolic curved outside edge 51 of the end cup 41 has a smaller bottom curve radius 53 and a larger top curve radius 55. This makes for a left hand and a right bracket, being reversed shapes, with FIGS. 6 and 9 showing a left hand bracket 25.

The bracket is stamped and punched to shape from a single piece of metal. Open slots 57 exist between the back face attachment wall 45 and each of the under sized middle portion and the under sized end portion, with each slot 57 extending across (transversely) the bracket 25. The manufacture of this bracket can be by various sequence of steps, as will be discussed below. However, it should be noted that a bracket also can be manufactured in a single stamping operation from a flat blank.

The cross-sectional shape of a bracket 25 follows the rail (bar length) 21 to which it is fitted. A C-shaped, like cross-section produces a hollow bar length 21 and a hollow bracket 25, both with an open back face. If it is required that the back face of a bar length 21 be closed, a plate section (not shown) could be inserted, by sliding into place a flat or curved finish piece which is held in the retaining flanges 39 of a bar length 21. Of course, this finish piece would need to be shorter than a bar length, as two brackets 25 would need to be held at either end of a bar length 21.

Normally, the end cup 41 portion of a bracket 25 is hollow with a open back face. However, an end cup 41 can have a closed or almost closed back face when an additional operation is conducted and the blank from which a bracket is made has additional material for closing the back of the end cup 41.

The back face attachment wall 45 is formed by stamping the surface of the metal backward at an angle, with a flat back surface 59, FIGS. 7, and 10a–10d. Typically the angle of incline of the wall section 61 connected to the shorter side top leg 63 of the C-cross-section is at an incline angle 65 of about 24 degrees. The second incline wall 67 connected to the longer side bottom leg 69 is at an inclined angle 71 of about 38 degrees.

The flat back surface carries at least two attachment points which can be screw holes, rivet holes or weld points. FIGS. 6, and 10a–10d show three evenly spaced extruded holes 73 for self-tapping screws.

The method of manufacturing the components for the modular grill can take a number or various steps with alternative steps to each. These variations are within the scope of the present invention, a create differing product flow and manufacturing efficiencies which result in different costs of manufacture.

Figures 11A, 11B:
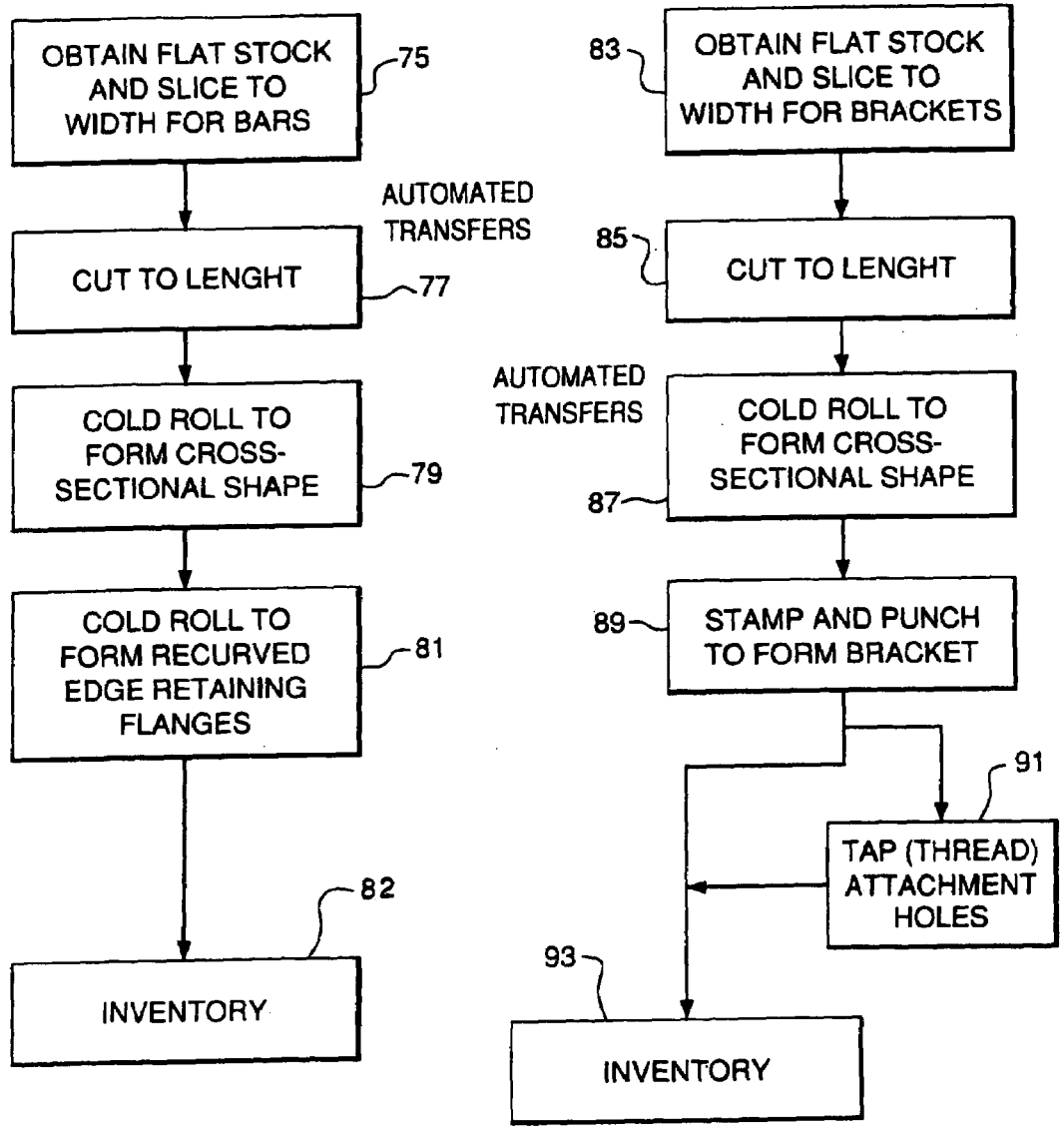
FIG. 11a is a block diagram for a sequence of process steps for manufacturing bar lengths.
FIG. 11b is a block diagram for a sequence of process steps for manufacturing brackets.

In a completely automated process FIG. 11a, with automated transfers between process steps such as by conveyor, chutes, wheels and formers, flat stock is first obtained and sliced to width for forming the bar lengths step 75. Each bar length is cut 77 to length. The sliced and cut blanks are fed into a cold roll former to form the cross-sectional shape 79. The recurved retaining flanges can also be formed at that station, or can be formed in a following cold roll step 81 immediately down line. The bar length 21 product is then inventoried 82.

Similar steps are performed in a similar line for forming the brackets 25. If the end cup 41 is not symmetrical in shape, two lines for brackets are needed, one for left-handed and one for right-handed brackets. Flat stock is obtained and sliced to a width for brackets, step 83, FIG. 11b. Their are automated transfers between operation stations. The stock is then cut to length for each bracket, step 85. Where brackets are cold rolled to cross-sectional shape, this is then done 87. These two steps 83, 85, 87 will process both the left-handed and the right-handed brackets. Left-handed bracket material is then passed to a specific stamp and punch forming step 89, while right-handed bracket material is moved to a shape specific stamp and punch forming step 89. Where extruded (stamped and punched) attachment holes need finishing or tapping for threads they are then passed to that step 91. Finished brackets are inventoried, step 93.

Figure 12:
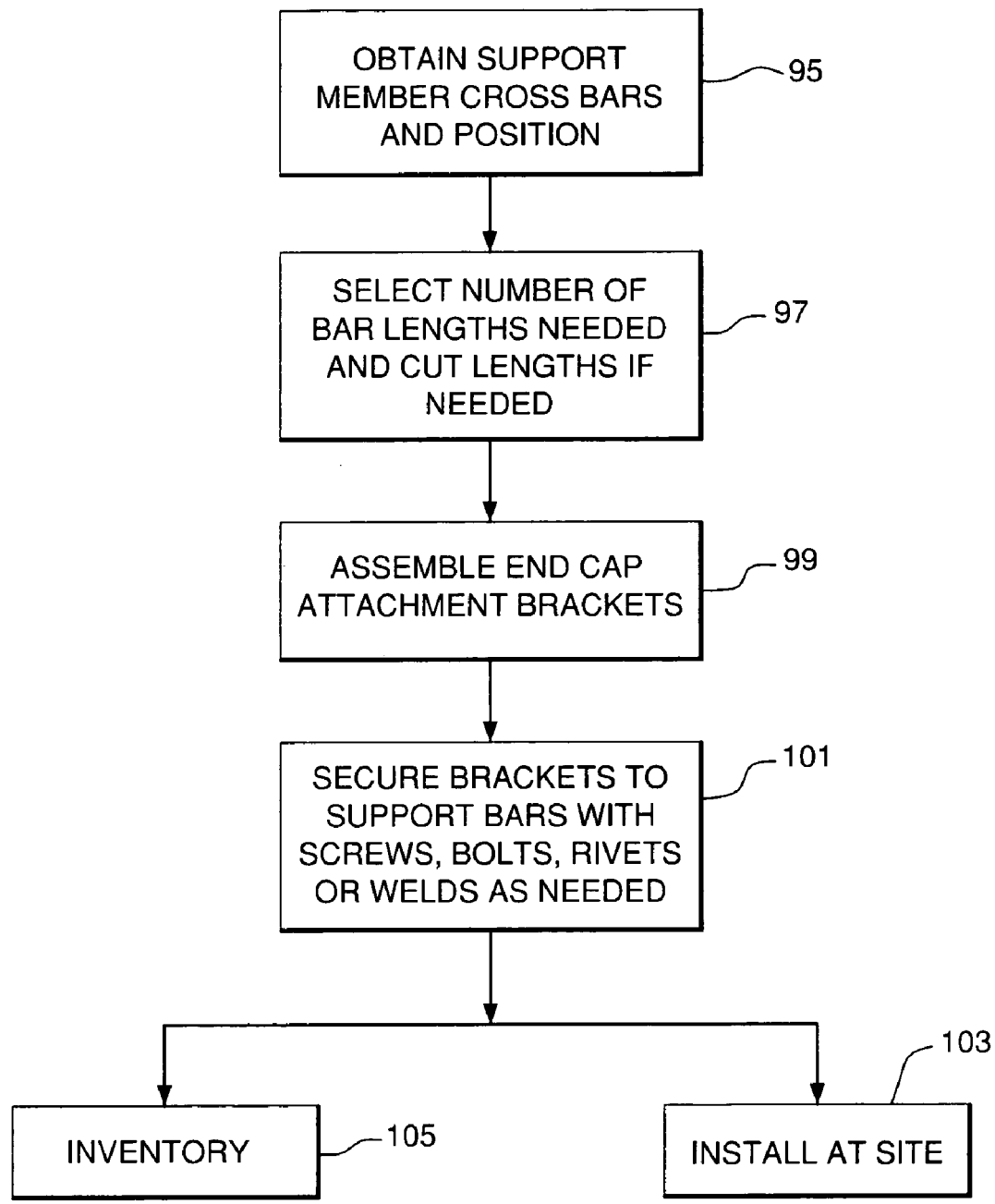
FIG. 12 is a block diagram for a sequence of process steps for assembling a section from the manufactured bar lengths and brackets.

A modular grill is assembled by obtaining the support member cross bars and positioning same, step 95, FIG. 12. Thereafter, a number of bar lengths are selected and their individual lengths are cut for a specific installation, if needed, step 97. End caps attachment brackets 25 are assembled on each bar length, step 99, and the brackets are then secured to the support bars by screws, rivets, or weld points, step 101. The modular grill is then installed at the site, step 103 or inventoried 105.

Many changes can be made in the above-described invention without departing from the intent and scope thereof. It is therefore intended that the above description be read in the illustrative sense and not in the limiting sense. Substitutions and changes can be made while still being with the scope and intent of the invention and of the appended claims.

What is claimed is:

1. A modular grill, comprising:
    a plurality of bar lengths forming rails of said grill said bar lengths having a predetermined cross-sectional shape; and
    a pair of brackets for holding each said bar length in position;
    wherein each said bracket has a cross-sectional shape which corresponds to the cross-sectional shape of a bar length and has an end cap for dressing the end reveal of said bar length.

2. The modular grill of claim 1, wherein each said bar length is a channel-shaped member having a recurved leg at each side leg of said channel, said recurved leg forming a retaining flange.

3. The modular grill of claim 2, wherein each said channel-shaped bar length is a C-shaped channel.

4. The modular grill of claim 3, wherein each said bracket has a C-shaped channel portion which portion slides inside of a respective end of said bar length and is held against the inside face thereof by said retaining flanges on said bar length.

5. The modular grill of claim 4, wherein said bracket end cap is an end cup having an open side contiguous with the open side of said C-shaped channel portion of said bracket.

6. The modular grill of claim 5, wherein said C-shaped channel portion of said bracket is under sized to fit within said bar length, wherein there is a transition of said end cup to said under sized portion forming a step down abutment shoulder which abuts the end of said bar length when said bracket is fully inserted therein.

7. The modular grill of claim 6, wherein said bracket also includes a flat back surface within the area of said under sized portion, said flat back surface leaving an under sized middle portion and an under sized end portion, said two under sized portions seating flush against the inside of said bar length when said bracket is fully seated.

8. The modular grill of claim 7, wherein said bracket flat back surface is connected to the respective legs of said C-shaped bracket by inclined wall sections.

9. The modular grill of claim 8, wherein said C-shaped bar length has a longer bend joining a first shorter side leg and a shorter bend joining a second longer side leg.

10. The modular grill of claim 9, wherein said bracket under sized middle and end portions cross-sectional shape conform to said bar length cross-sectional shape; and wherein a bracket flat back face extends between said inclined wall sections.

11. The modular grill of claim 10, wherein said bracket inclined wall section joining said flat back face to said shorter side leg inclines at an angle of about 24 degrees.

12. The modular grill of claim 11, wherein said bracket inclined wall section joining said flat back face to said longer side leg inclines at an angle of about 38 degrees.

13. The modular grill of claim 12, wherein said bracket flat back face carries at least two attachment points.

14. The modular grill of claim 13, wherein said bracket flat back face carries three attachment points.

15. The modular grill of claim 14 wherein said bracket flat back face attachment points are each selected from the group of: extruded holes, threaded holes, rivet holes and weld points.

16. The modular grill of claim 15 wherein said bar lengths are bowed.

17. A method of making a modular grill comprising the steps of:

obtaining flat stock and slicing to width for rails;
cutting said sliced stock to length for rails;
cold roll forming the cross-sectional shape of said rails; and
cold roll forming two retaining flanges in each rail.

18. The method of claim 17 further including the steps of:
obtaining flat stock and slicing to width for brackets;
cutting to length;
cold rolling forming the cross-sectional shape of said brackets to conform to the cross-sectional shape of said rails;
stamping and punching said formed shape to form said bracket having an end cup, a under sized middle portion and an under sized opposite end portion, with a back face attachment wall between said under sized portions.

19. The method of claim 18 also further including the steps of:
obtaining a number of said cold formed rails;
selecting two brackets for each rail;
mounting a bracket to each end of a rail by siding said bracket onto said rail retaining flanges; and
mounting said rails to supports by mounting said brackets thereto.

* * * * *

UNITED STATES PATENT AND TRADEMARK OFFICE
CERTIFICATE OF CORRECTION

PATENT NO. : 6,932,413 B2
DATED : August 23, 2005
INVENTOR(S) : Thomas M. Lloyd

It is certified that error appears in the above-identified patent and that said Letters Patent is hereby corrected as shown below:

Column 1,
Line 25, replace "show" with -- shows --.
Line 53, replace "grilles" with -- grills --.

Column 2,
Line 8, replace "and end cap" with -- an end cap --.
Line 51, replace "grille" with -- grill --.

Column 3,
Line 52, insert -- a -- before "front" and -- view -- after "elevation".
Lines 52 and 54, replace "grille" with -- grill --.
Line 55, insert -- view -- after "elevation".

Column 4,
Lines 22 and 36, replace "grille" with -- grill --.

Column 5,
Line 1, replace "as" with -- a --.
Line 30, replace "with a open" with -- with an open --.
Line 48, replace "or" with -- of --.
Line 62, replace "inventoried 82." with -- inventoried, step 82. --.

Column 8,
Line 13, replace "a under sized" with -- an under sized --.
Line 20, replace "siding" with -- sliding --.

Signed and Sealed this

Eleventh Day of October, 2005

JON W. DUDAS
*Director of the United States Patent and Trademark Office*